United States Patent
Gassho et al.

(10) Patent No.: US 7,830,849 B2
(45) Date of Patent: Nov. 9, 2010

(54) WIRELESS COMMUNICATION PRINT SERVER

(75) Inventors: Kazuhito Gassho, Nagano-ken (JP); Susumu Shiohara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 372 days.

(21) Appl. No.: 11/968,575

(22) Filed: Jan. 2, 2008

(65) Prior Publication Data
US 2008/0130046 A1    Jun. 5, 2008

Related U.S. Application Data

(63) Continuation of application No. 10/715,834, filed on Nov. 19, 2003, now abandoned.

(30) Foreign Application Priority Data

Nov. 26, 2002    (JP) .............................. 2002-342583

(51) Int. Cl.
*H04Q 7/24* (2006.01)
(52) U.S. Cl. ...................... 370/338; 370/349; 370/356; 370/359

(58) Field of Classification Search ....... 358/3.02–3.32; 370/352–364
See application file for complete search history.

(56) References Cited

U.S. PATENT DOCUMENTS

| | | | | |
|---|---|---|---|---|
| 5,987,228 A | * | 11/1999 | Nishizawa | 358/1.15 |
| 6,314,476 B1 | * | 11/2001 | Ohara | 710/15 |
| 2004/0004734 A1 | * | 1/2004 | Brown et al. | 358/1.14 |
| 2005/0212670 A1 | * | 9/2005 | Cariffe | 340/500 |

FOREIGN PATENT DOCUMENTS

JP    2002-7080 A    1/2002

* cited by examiner

*Primary Examiner*—Patrick N Edouard
*Assistant Examiner*—Dai A Phuong
(74) *Attorney, Agent, or Firm*—Sughrue Mion, PLLC

(57) ABSTRACT

An object of the present invention is to provide a wireless communication print server 25 that makes a printer 20 connected the wireless communication print server 25 unavailable if a parameter 50 is in the initial state. When the wireless communication print server 25 receives a print request, determines whether or not the parameter 50 is in the initial state, and then rejects the print request if the parameter 50 is in the initial state. If the parameter 50 that has been changed by a change unit 60 is not in the initial state, the wireless communication print server makes the printer 20 connected with the wireless communication print server 25 available.

15 Claims, 3 Drawing Sheets

WIRELESS COMMUNICATION PRINT SERVER

This is a continuation of application Ser. No. 10/715,834 filed Nov. 19, 2003 now abandoned. The entire disclosure of the prior application, application Ser. No. 10/715,834, is considered part of the disclosure of this continuation application and is hereby incorporated by reference in its entirety.

BACKGROUND OF THE INVENTION

1. Field of the Invention

The present invention relates to a wireless communication print server for relaying a print request received through wireless communications to a printer.

2. Description of the Related Art

In the prior art, a wireless communication print server has been proposed that is connected with a terminal and a printer to relay a print request between them via a wireless LAN (JAPANESE PATENT LAID-OPEN GAZETTE No. 2002-7080). In order to establish wireless communications in the wireless LAN, each device of the wireless communication print server, the terminal, and the printer must have identical parameters (hereinafter referred to as "communication parameter"), which include "ESS-ID," "Communication Mode," "Communication Channel," and "WEP key." In other words, it is impossible to print through the wireless LAN if some of the communication parameters differ among the devices.

It is a complicated task for the user to set the communication parameters of each device. In the case of the devices from an identical manufacturer, the communication parameters in the initial setting may allow communications. Therefore, some users may use such devices in the initial setting. However, the initial setting results in unsatisfactory security. For example, a third person can perform unauthorized access to the printer via the wireless LAN intentionally or unintentionally.

SUMMARY OF THE INVENTION

The present invention provides a wireless communication print server that can prevent unauthorized access to a printer.

The wireless communication print server of the present invention is directed to a wireless communication print server for relaying a print request received through wireless communications to a printer, the wireless communication print server comprising: a retention unit that retains a parameter for establishing wireless communications; a determination unit that determines whether or not the setting of the parameter is in the initial state; a rejection unit that ignores the print request if the setting of the parameter is in the initial state; and a change unit that receives a change instruction for the setting of the parameter and changes the setting of the parameter from the initial state based on the change instruction.

The present invention enables the printer connected with the wireless communication print server to be made unavailable irrespective of the user's intention if the parameter of the wireless communication print server remains in the initial state. Therefore, it can prevent unauthorized print by the aid of the parameter in the initial state. However, the present invention allows wireless communications for changing the setting to be received, and thus enables the setting of the parameter to be changed without wired connection. In this manner, the present invention can prevent unauthorized access while ensuring the convenience in changing the setting of the parameter.

The initial state includes a state when the wireless communication print server is shipped from its manufacturing factory, and a state when the setting of the wireless communication print server is reset to the default. The print request can be distinguished from other communications, for example, based on whether or not a print protocol is used.

The wireless communication print server is further characterized in that the retention unit retains a predetermined rejection flag that indicates whether or not the setting of the parameter is in the initial state, and the determination unit determines based on the rejection flag, the wireless communication print server further comprising: a release unit that changes the rejection flag to a value indicating printing-availability when the setting of the parameter is changed from the initial state.

This ensures easy determination of whether or not the rejection flag is in the initial state based on only the value of the rejection flag without checking the values of all parameters.

The wireless communication print server may further comprise: a protocol interpretation unit that interprets based on a protocol the print request received through wireless communications; and a single driver that receives and sends the print request from a plurality of the protocol interpretation units to the printer, wherein the rejection unit may be included in the driver.

The print request is sent to the wireless communication print server under a variety of protocols. Any print request interpreted by each protocol interpretation unit is sent to the printer via the driver. Therefore, the above configuration enables the single rejection unit included in the driver to deal with any print request without providing a separate rejection unit for each protocol interpretation unit, and thereby simplifying the configuration.

The rejection unit may send back a notification irrespective of the actual operational state of the printer to indicate that the printer is unavailable.

The terminal that has received the notification indicating printing-unavailability can know that it cannot print. When the original user of the wireless communication print server receives this notification, he or she knows that the parameter should be changed. The notification that the printer is unavailable enables the print request to be rejected even if the printer functions normally and thus is actually available.

This notification includes a "busy notification." The "busy notification" indicates that the printer is printing. This is convenient since an additional module need not be provided for rejection.

In the present invention, the various features described above may be combined or partly omitted according to the requirements. The present invention is not limited to the above wireless communication print server but may be configured as a variety of aspects such as a control method of controlling the operation of the wireless communication print server. The features described above may be applied to any of the aspects according to the requirements.

DESCRIPTION OF THE PREFERRED EMBODIMENTS

A. Embodiments

A1. Functional Blocks

Figure 1:
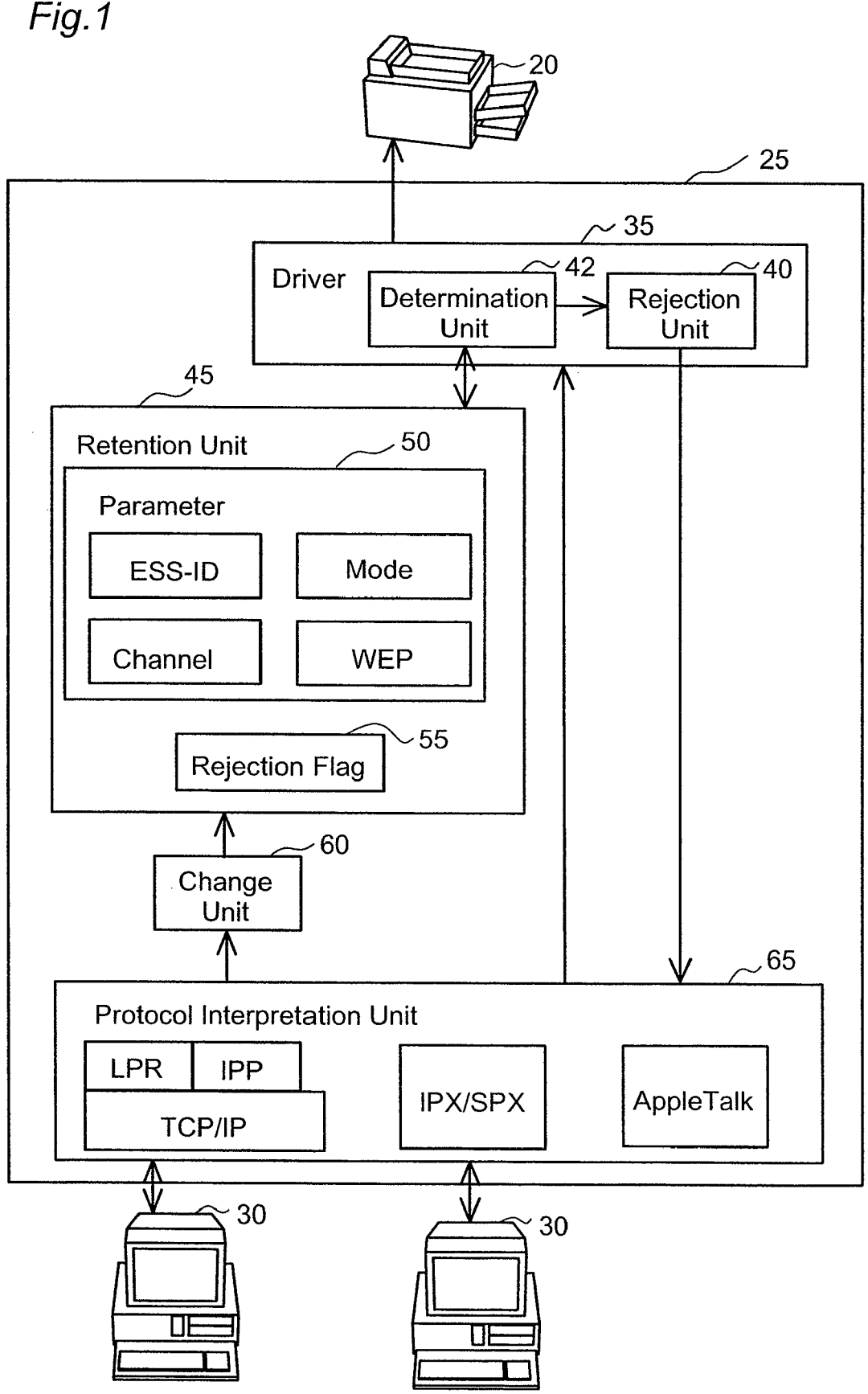
FIG. 1 is a functional block diagram of a wireless communication print server 25.

FIG. 1 is a functional block diagram of a wireless communication print server 25. The wireless communication print server 25 receives a print request from a terminal 30 through wireless communications and then sends it to a printer 20. The wireless communication print server 25 may be incorporated within the printer 20 or be an external one.

A protocol interpretation unit 65 interprets protocols for communications or print requests. The communication protocols include TCP/IP, IPX/SPX, AppleTalk, and the like, and thus the protocol interpretation unit 65 includes functional parts for interpreting the respective protocols in order to deal with a print request represented under each of the protocols. In addition, an upper layer of TCP/IP includes functional parts for interpreting print protocols such as LPR and IPP.

A retention unit 45 has parameters 50 and a rejection flag 55, which are required for establishing the wireless communications. The parameters 50 include "ESS-ID," "Mode," "Channel," and "WEP."

If both sides that desire to perform the wireless communications do not have an identical "ESS-ID," the network is not recognized.

The "Mode" represents a communication mode, which includes Adhoc Mode and Infrastructure Mode in the wireless communications. The Adhoc Mode enables terminals to have one-on-one connection such as peer-to-peer connection, and the Infrastructure Mode provides communications via a repeater (so-called access point). If the both sides that desire to perform the wireless communications do not have an identical "Mode," they cannot also communicate.

The "Channel" represents a number allocated to each of radio wave bands into which the entire radio wave band is divided. If the both sides that desire to perform the wireless communications do not have an identical "Channel," they cannot also communicate.

The "WEP" is a RC4 encryption function that is optionally implemented in IEEE802.11, and uses an encryption key having a maximum of 40-bit encryption strength to encode and thus protect data to be sent and received. If the both sides that desire to perform the wireless communications do not have an identical encryption key, they cannot communicate. However, the encryption key is not set up in the initial state.

The rejection flag 55, which indicates whether or not the parameters 50 are in the initial state, takes the value "1" if they are in the initial state and otherwise takes the value "0." The parameters 50 are in the initial state if the wireless communication print server 25 has its setting unchanged after it was shipped from its manufacturing factory or if the user of the wireless communication print server 25 has performed a process for resetting the setting of the wireless communication print server 25 to the default.

A change unit 60 has a function of changing the parameters 50 and the rejection flag 55.

A driver 35 sends the print request interpreted by the protocol interpretation unit 65 to the printer 20. However, a determination unit 42 works prior to the print request being sent. The determination unit 42 determines based on the rejection flag 55 whether or not the parameters 50 are in the initial state. If it is determined that the parameters 50 are in the initial state, a rejection unit 40 instructs to send a "busy notification" indicating printing-unavailability, and does not send the print request to the printer 20. If it is determined that the parameters 50 are not in the initial state, the print request is sent to the printer 20.

A2. Processes

Figure 2:
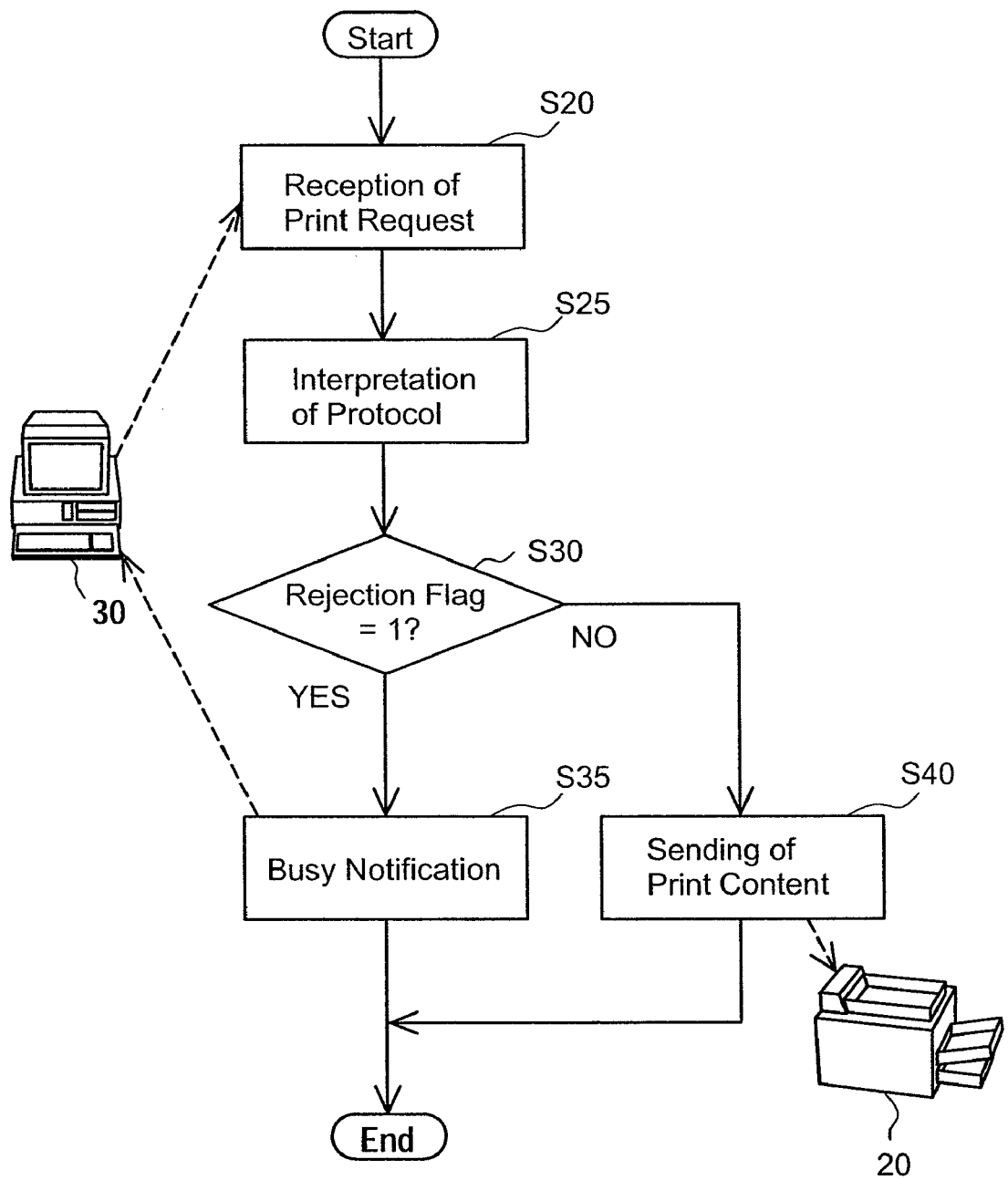
FIG. 2 is a flowchart of a process performed when the wireless communication print server 25 receives a print request.

FIG. 2 is a flowchart of a process performed when the wireless communication print server 25 receives the print request. When the wireless communication print server 25 receives the print request from the terminal 30 (step S20), it uses the protocol interpretation unit 65 to interpret the protocol (step S25). The determination on whether or not the received request is a print request can be based on whether or not a print protocol is used for the received request.

The protocol-interpreted print request is sent to a driver 35. When the determination unit 42 of the driver 35 receives the print request, it refers to the rejection flag 55 included within the retention unit 45. If the rejection flag 55 is equal to 1 (step S30), the rejection unit 40 sends a "busy notification" to the terminal 30 (step S35). If the rejection flag 55 is equal to 0 (step S30), the print content is sent to the printer 20 (step S40).

Figure 3:
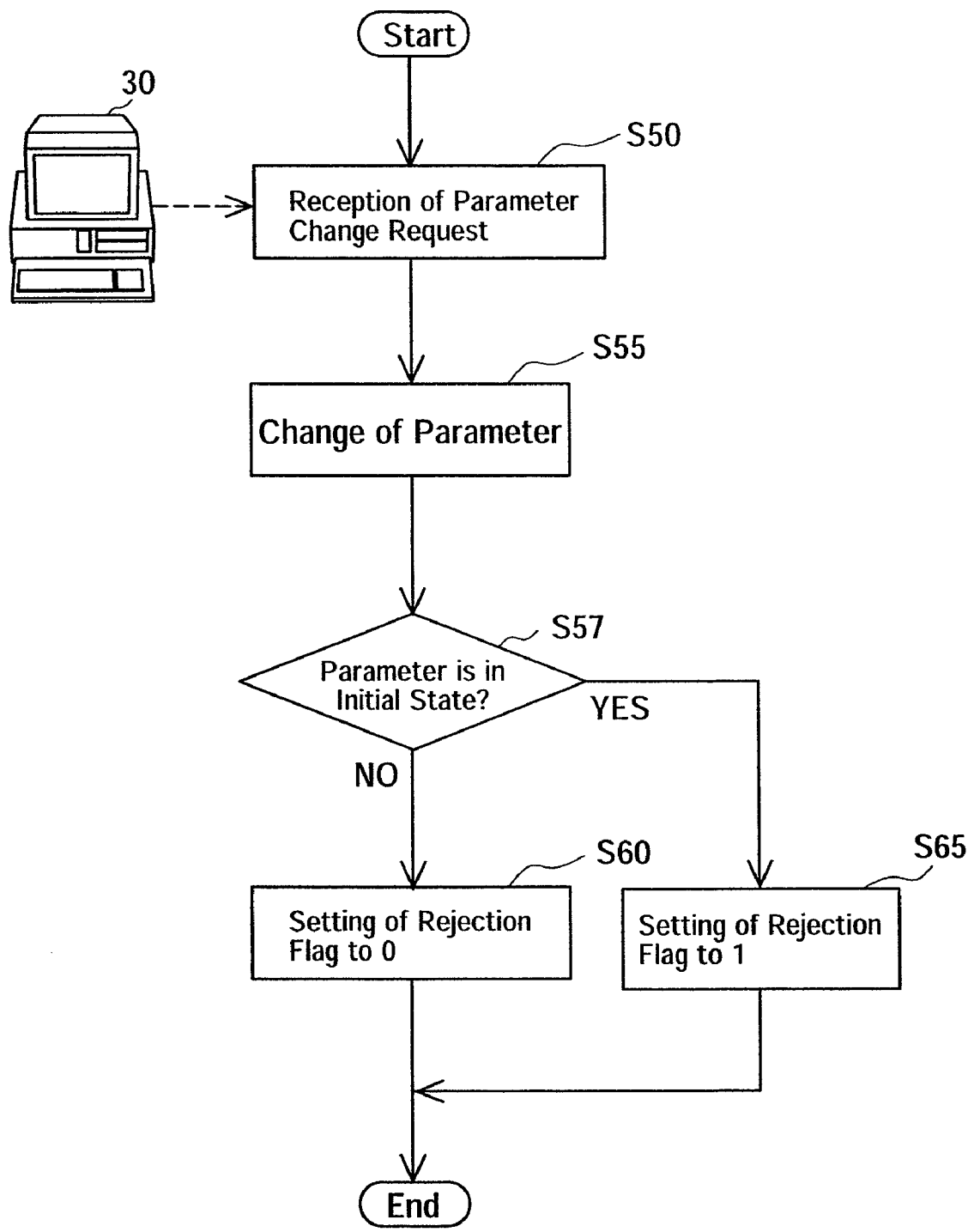
FIG. 3 is a flowchart that shows a process for changing a parameter.

FIG. 3 is a flowchart showing a process for changing a parameter. The user of the wireless communication print server 25 changes the parameter after the purchase of the wireless communication print server 25 in order to print through the wireless communication print server 25. The user may change a parameter according to an environment.

When the wireless communication print server 25 receives a parameter change request from the terminal 30 (step S50), it uses the change unit 60 to change the parameter 50 (step S55). If this change causes the parameter 50 not to be in the initial state (step S57), the rejection flag 55 is set to 0 (step S60). This process ensures the print through the wireless communication print server 25.

On the contrary, if the change of the parameter 50 causes the parameter 50 to be in the initial state (step S57), the rejection flag 55 is set to 1 (step S65). This process enables the print through the wireless communication print server 25 to be rejected.

A3. Effects

The wireless communication print server 25 described above enables the printer 20 connected with the wireless communication print server 25 to be made unavailable if the parameters 50 of the wireless communication print server 25 remain in the initial state. That is, it can prevent unauthorized print since it is impossible to perform the unauthorized print by matching the parameters 50 of the terminal 30 with the parameters 50 of the wireless communication print server 25 in the initial state.

In addition, even if the parameters 50 of the wireless communication print server 25 remain in the initial state and accidentally corresponds to those of the terminal 30 that does not intend unauthorized print, the wireless communication print server 25 can reject the print from the terminal 30.

B. Modifications

Although the embodiments of the present invention have been described, it should be noted that the present invention is not limited to the above embodiments and may implement various aspects without departing from the spirit of the present invention.

For example, the rejection flag 55 may remain equal to 0 when the parameters 50 are reset to the initial state except for the time of factory shipment. This is effective in the case that some processes are to be performed on the wireless communication print server 25 whose parameters 50 are in the initial state.

Alternatively, the rejection flag 55 is not necessarily provided, and thus the determination unit 42 may directly check whether or not all or part of the parameters 50 are in the initial state. Furthermore, the determination unit 42 and the rejection unit 40 may be included within the protocol interpretation unit 65. This enables the determination at an earlier stage after the reception of the print request to be made on whether or not the printer 20 is available.

The notification sent in the case of the printer 20 being unavailable is not limited to the "busy notification," but may indicate that the print is rejected since the parameters 50 are in the initial state. This enables the sender of the print request to know why the print is rejected.

What is claimed is:

1. A wireless communication print server for relaying a print request received through wireless communications to a printer, said wireless communication print server comprising:
    a retention unit that retains parameters for establishing wireless communications;
    a determination unit that determines whether or not the setting of said wireless communication parameters registered in the retention unit is in the initial state;
    a rejection unit that ignores said print request corresponding to said wireless communication parameters in the initial state if the setting of said wireless communication parameters is in the initial state; and
    a change unit that receives a change instruction for the setting of said wireless communication parameters and changes the setting of said wireless communication parameters from the initial state based on the change instruction,
    wherein the initial state of the wireless communication parameters is either one of a factory shipment setting or a default setting, and the wireless communication parameters in the initial state are sufficient to cause the wireless communication print server to wirelessly communicate with other devices if it were not for the rejection unit.

2. A wireless communication print server according to claim 1, wherein
    said retention unit retains a predetermined rejection flag that indicates whether or not the setting of said parameter is in the initial state, and
    said determination unit determines based on said rejection flag,
    said wireless communication print server further comprising:
        a release unit that changes said rejection flag to a value indicating printing-availability when the setting of said parameter is changed from the initial state.

3. A wireless communication print server according to claim 1, further comprising:
    a protocol interpretation unit that interprets based on a protocol the print request received through wireless communications; and
    a single driver that receives and sends the print request from a plurality of said protocol interpretation units to the printer,
    wherein said rejection unit is included in said driver.

4. A wireless communication print server according to claim 1, wherein
    said rejection unit sends back a notification irrespective of the actual operational state of said printer to indicate that said printer is unavailable.

5. The wireless communication print server according to claim 1, wherein
the wireless communication parameters comprise an ESSID, a mode of the wireless communications, a channel of the wireless communications, and an encryption key for the wireless communications.

6. A method of controlling a wireless communication print server for relaying a print request received through wireless communications to a printer, wherein
    said wireless communication print server comprises a retention unit that retains parameters for establishing wireless communications,
    said method comprising:
        a determination step of determining whether or not the setting of said wireless communication parameters registered in the retention unit is in the initial state;
        a rejection step of ignoring said print request corresponding to said wireless communication parameters in the initial state if the setting of said wireless communication parameters is in the initial state; and
        a change step of receiving a change instruction for the setting of said wireless communication parameters and changing the setting of said wireless communication parameters from the initial state based on the change instruction,
        wherein the initial state of the wireless communication parameters is either one of a factory shipment setting or a default setting, and the wireless communication parameters in the initial state are sufficient to cause the wireless communication print server to wirelessly communicate with other devices if it were not for the rejection step.

7. A method according to claim 6, wherein
said retention unit retains a predetermined rejection flag that indicates whether or not the setting of said parameter is in the initial state, and
said determination step determines based on said rejection flag,
said method further comprising:
    a release step of changing said rejection flag to a value indicating printing-availability when the setting of said parameter is changed from the initial state.

8. A method according to claim 6, wherein
said wireless communication print server further comprises:
    a protocol interpretation unit that interprets based on a protocol the print request received through wireless communications; and
    a single driver that receives and sends the print request from a plurality of said protocol interpretation units to the printer,
wherein said rejection step is performed by said driver.

9. A method according to claim 6, wherein
said rejection step sends back a notification irrespective of the actual operational state of said printer to indicate that said printer is unavailable.

10. The method according to claim 6, wherein
the wireless communication parameters comprise an ESSID, a mode of the wireless communications, a channel of the wireless communications, and an encryption key for the wireless communications.

11. A recording medium that records a computer program for controlling a wireless communication print server for relaying a print request received through wireless communications to a printer, wherein
    said wireless communication print server comprises a retention unit that retains parameters for establishing wireless communications, said program comprising:
- a determination program code for determining whether or not the setting of said wireless communication parameters is in the initial state;
- a rejection program code for ignoring said print request corresponding to the wireless communication parameters in the initial state if the setting of said wireless communication parameters is in the initial state; and
- a change program code for receiving a change instruction for the setting of said wireless communication parameters and changing the setting of said the wireless communication parameters from the initial state based on the change instruction,
- wherein the initial state of the wireless communication parameters is either one of a factory shipment setting or a default setting, and the wireless communication parameters in the initial state are sufficient to cause the wireless communication print server to wirelessly communicate with other devices if it were not for the rejection program code.

12. A recording medium according to claim 11, wherein said retention unit retains a predetermined rejection flag that indicates whether or not the setting of said parameter is in the initial state, and said determination program code determines based on said rejection flag, said recording medium comprising:
- a release program code that changes said rejection flag to a value indicating printing-availability when the setting of said parameter is changed from the initial state.

13. A recording medium according to claim 11, further comprising:
- a protocol interpretation program code that interprets based on a protocol the print request received through wireless communications; and
- a single driver that receives and sends the print request from a plurality of said protocol interpretation units to the printer,
- wherein said rejection program code is included in said driver.

14. A recording medium according to claim 11, wherein said rejection program code sends back a notification irrespective of the actual operational state of said printer to indicate that said printer is unavailable.

15. The recording medium according to claim 11, wherein the wireless communication parameters include an ESSID, a mode of the wireless communications, a channel of the wireless communications, and an encryption key for the wireless communications.

* * * * *